(12) United States Patent  
Toraguchi et al.

(10) Patent No.: US 8,428,567 B2
(45) Date of Patent: *Apr. 23, 2013

(54) CORDLESS TELEPHONE UNIT INCLUDING AUDIBLE CONFIRMATION OF CALLED PARTY

(75) Inventors: Kosei Toraguchi, Fukuoka (JP); Kunio Kotsuki, Fukuoka (JP)

(73) Assignee: Panasonic Corporation, Osaka (JP)

( * ) Notice: Subject to any disclaimer, the term of this patent is extended or adjusted under 35 U.S.C. 154(b) by 819 days.

This patent is subject to a terminal disclaimer.

(21) Appl. No.: 12/033,456

(22) Filed: Feb. 19, 2008

(65) Prior Publication Data

US 2008/0214244 A1 Sep. 4, 2008

Related U.S. Application Data

(63) Continuation of application No. 11/219,993, filed on Sep. 6, 2005, now Pat. No. 7,359,697, which is a continuation of application No. 10/231,876, filed on Aug. 29, 2002, now abandoned.

(30) Foreign Application Priority Data

Aug. 29, 2001 (JP) ................................. 2001-259293

(51) Int. Cl.
  *H04M 3/42* (2006.01)
  *H04B 1/38* (2006.01)
(52) U.S. Cl.
  USPC ............................ 455/415; 455/564; 455/566

(58) Field of Classification Search .................. 455/415, 455/462, 465, 566, 567, 550.1, 564; 379/207.14, 379/207.15, 88.02
See application file for complete search history.

(56) References Cited

U.S. PATENT DOCUMENTS 4,755,932 A * 7/1988 Diedrich .................... 379/88.16
4,894,861 A   1/1990 Fujioka
(Continued)

FOREIGN PATENT DOCUMENTS

JP   361080938 A   4/1986
JP   05-103069     4/1993
(Continued)

OTHER PUBLICATIONS

PCT International Search Report for PCT/JP02/08556, dated Mar. 6, 2003.

*Primary Examiner* — Nguyen Vo
(74) *Attorney, Agent, or Firm* — RatnerPrestia

(57) ABSTRACT

A main phone of a cordless telephone unit has i) a cordless communicator for establishing cordless communications with a cordless handset; and ii) a voice generator for converting called-party information received from a cordless handset into voice data. On the other hand, a cordless handset has voice-data output section for reading out the voice data. Called-party information received from the cordless handset is converted into voice data at the voice generator then returned to the cordless handset. Receiving the voice data from the main phone, the cordless handset reads it out prior to placing a call. Sharing the voice generating function of the main phone with the cordless handset can thus provide the handset with a voice-generator-free structure.

10 Claims, 9 Drawing Sheets

U.S. PATENT DOCUMENTS

| | | |
|---|---|---|
| 5,095,503 A | 3/1992 | Kowalski |
| 5,349,638 A | 9/1994 | Pitroda et al. |
| 5,594,778 A | 1/1997 | Schaupp et al. |
| 5,602,900 A | 2/1997 | Hattori |
| 5,646,979 A | 7/1997 | Knuth |
| 5,752,195 A | 5/1998 | Tsuji et al. |
| 5,987,336 A * | 11/1999 | Sudo et al. .................. 455/566 |
| 6,067,358 A | 5/2000 | Grant |
| 6,141,560 A | 10/2000 | Gillig et al. |
| 6,463,143 B2 | 10/2002 | Bennett et al. |
| 7,359,697 B2 * | 4/2008 | Toraguchi et al. ............ 455/415 |

FOREIGN PATENT DOCUMENTS

| | | |
|---|---|---|
| JP | 06-164489 | 6/1994 |
| JP | 06-334721 | 12/1994 |
| JP | 07-297923 A | 11/1995 |
| JP | 08-154130 A | 6/1996 |
| JP | 08-195801 A | 7/1996 |
| JP | 411341142 A | 12/1999 |
| KR | 2003-051540 A | 6/2003 |

* cited by examiner

CORDLESS TELEPHONE UNIT INCLUDING AUDIBLE CONFIRMATION OF CALLED PARTY

This application is a continuation of U.S. patent application Ser. No. 11/219,993, filed Sep. 6, 2005, which is a continuation of U.S. patent application Ser. No. 10/231,876, filed Aug. 29, 2002 (abandoned), all of the contents of which are incorporated herein by reference.

FIELD OF THE INVENTION

The present invention relates to a cordless telephone unit that notifies information on a called-party to a caller as an audible confirmation prior to placing a call.

BACKGROUND OF THE INVENTION

A "talking" cordless telephone unit has already introduced on the market. The unit can let a caller know information on a called-party before a call is placed, reducing a possibility of dialing a wrong number. In such a cordless telephone unit, a main phone and a cordless handset have respective voice generators for converting called-party information into voice data.

The more items called-party information has, the more functions the voice generator requires: a function converting text data to voice data will do for called-party information having a telephone number only. On the other hand, in a cordless telephone unit equipped with an electronic telephone list, a telephone number and a name corresponding to the number can be stored in the list. In other words, called-party information selected from the telephone list contains a telephone number and a name. That is, the voice generator of a cordless telephone unit having an electronic telephone list needs a function to convert text data associating with a name into voice data so as to be recognizable as a name. However, providing both of the main phone and the cordless handset with such a high-performance voice generator has consequently increased the production cost.

SUMMARY OF THE INVENTION

In the cordless telephone unit of the present invention, a main phone includes a voice generator and a transmitter. Receiving called-party information from a cordless handset, the voice generator of the main phone converts it into voice data and the transmitter returns the voice data to the cordless handset. The cordless handset "reads out" the voice data by sharing with the function of "talking" called-party information of the main phone. This can avoid the necessity for equipping the cordless handset with the reading-out function. So this realizes the simplified cordless handset, consequently makes it economical.

Japanese Patent Application Non-Examined Publication No. H 5-103069 introduces a technology bearing a faint resemblance to the present invention: according to the technology, when called-party information is entered through a cordless handset to be added as an abbreviated dialing number into memory, a voice-generator of a main phone converts the information into voice data and returns it to the cordless handset. Still—even with such a function, a possibility of having a wrong number persists.

DESCRIPTION OF THE PREFERRED EMBODIMENTS

The preferred embodiments of the present invention are described hereinafter with reference to the accompanying drawings, in which like parts are identified by the same reference marks.

First Preferred Embodiment

Figure 1:
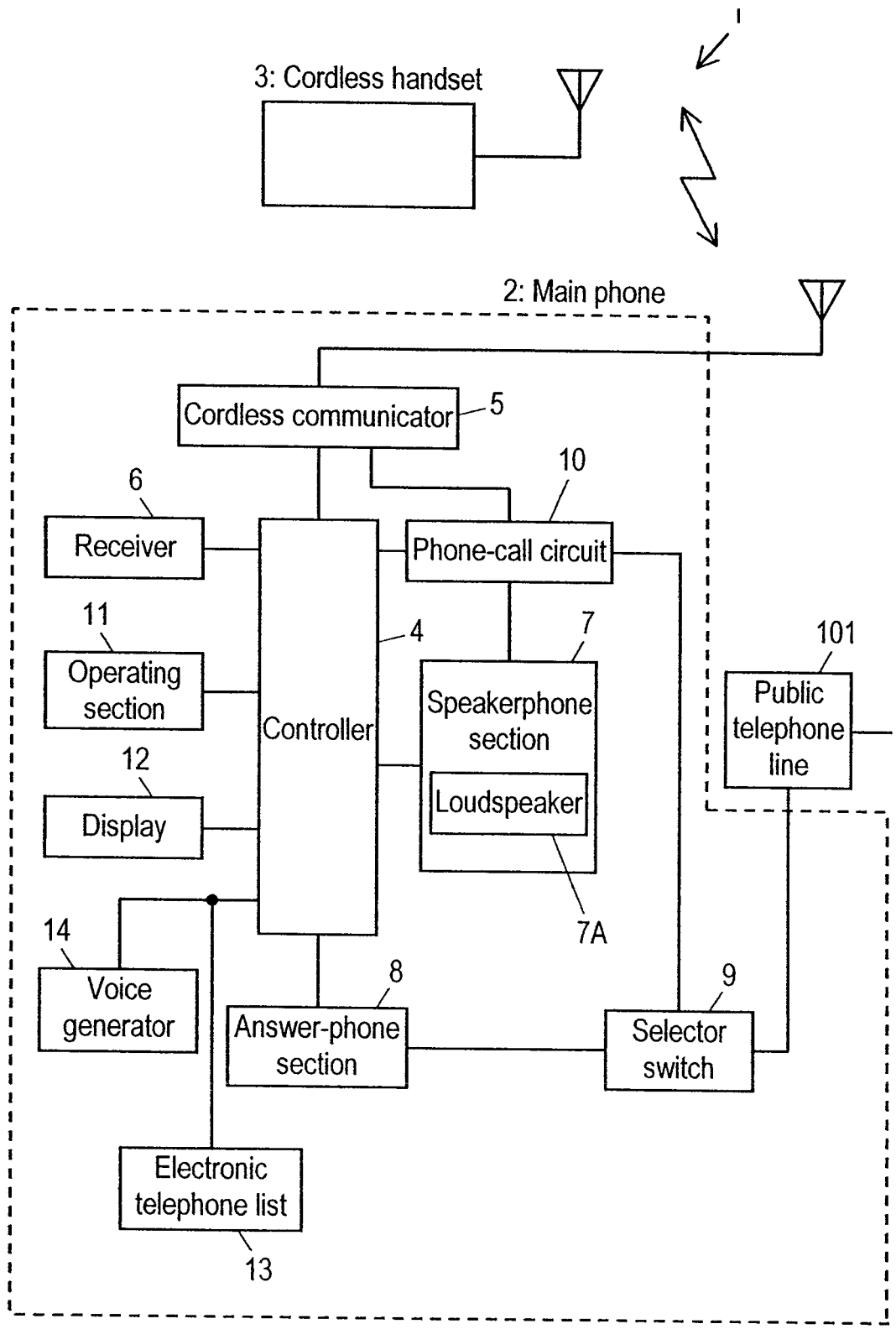
FIG. 1 is a block diagram indicating the structure of a main phone of a cordless telephone unit in accordance with a first preferred embodiment of the present invention.

In FIG. 1, cordless telephone unit 1 includes i) main phone 2 connected to a telephone line and ii) at least one cordless handset 3. Main phone 2 and cordless handset 3 have cordless communications within the range of 100 to 150 m.

Main phone 2 exchanges voice signals, via telephone line 101, with a telephone at the other end of the line. At the same time, main phone 2 has cordless communications with cordless handset 3 via cordless communicator 5 (hereinafter referred to as communicator 5) having a radio transmitter and a radio receiver Controller 4, which is formed of a central processing unit (CPU), random access memory (RAM), and read only memory (ROM), is a total controller of main phone 2. Main phone 2 has receiver 6 tethered thereto by a receiver cord. With receiver 6 lifted off the hook, main phone 2 has cordless communications with cordless handset 3—making an extension call—and communicates with an outside phone via telephone line—making an outside call. In addition, main phone 2 has a speakerphone function: operating a switch disposed at speakerphone section 7 allows the user to place a call with the receiver rested on the hook. With the speakerphone function, the voice is out through loudspeaker 7A of speakerphone section 7. Phone-call circuit 10 transmits a signal for placing-a-call to telephone line 101, thereby forming a phone-call circuit between telephone line 101, communicator 5, and receiver 6 (or speakerphone section 7). In addition, main phone 2 has answer-phone section 8. If main phone 2 and handset 3 have no answer to incoming call, that is, there is no response to a predetermined number—for example, six times—of the bell-rings (not shown), controller 4 switches selector switch 9 from phone-call circuit 10 to answer-phone section 8 so that an incoming message is recorded.

When the user searches electronic telephone list 13 for called-party information through the operation of either dialing buttons (a 10-button keypad) or a list-search key disposed in operating section 11, main phone 2 finds information on a called-party that matches with the user's input and shows it on display 12. The called-party information obtained through the operation of the dialing buttons has a telephone number only. Whereas the information obtained through the operation of the list-search key has a name in addition to a telephone number. The user can add the telephone number and the name of a frequently used called-party to list 13. Main phone 2 accepts whichever comes first between the operation with dialing buttons and the search with a list-search key: when the user starts pushing the buttons, the information on a called-party previously searched with the list-search key is cleared off the display; contrarily, operating the list-search key erases the information previously shown through the operation of the dialing buttons. As long as the information on a called-party appears on the display, i.e., until the next search is requested, controller 4 temporarily keeps the information.

Receiving called-party information, controller 4 transmits it one by one to voice generator 14, where the information is converted into voice data. Loudspeaker 7A, which serves as a voice-output section, "reads out" the name and/or the telephone number of a called-party. Voice generator 14 having a CPU, RAM, and ROM as basic components is a sub-controller under controller 4.

When the user pushes the button marked "4" then the button marked "7", loudspeaker 7A reads out "four" then "seven" in synthesized voice. Each time the user enters numbers with the dialing buttons, for example, "4-7-4-7-2-...", loudspeaker 7A reads out them one by one, sounding "four-seven-four-seven-two-...", and display 12 shows them as a series of the numbers, such as "47472...".

Figure 2:
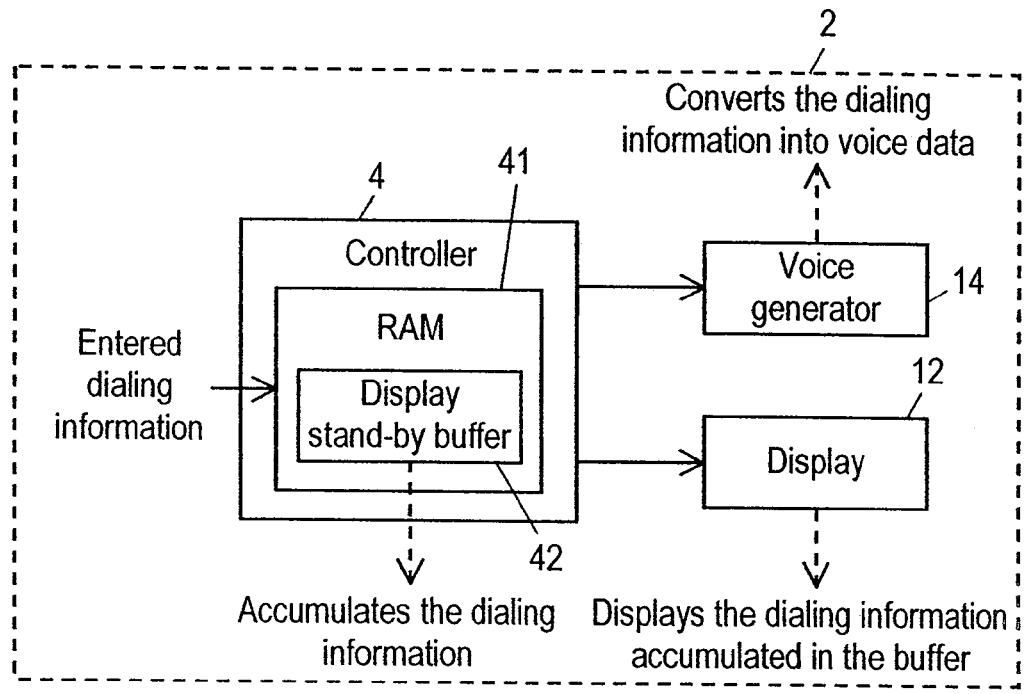
FIG. 2 is a schematic view indicating the process in which a controller of the main phone stores called-party information in response to entry operation by a user in accordance with the first preferred embodiment.

RAM 41 in controller 4, as shown in FIG. 2, has display stand-by buffer 42 as a temporally storage for called-party information to be shown on display 12. The number entered one at a time through the dialing buttons is not only transmitted to voice generator 14, but also accumulated in buffer 42. In entering numbers, each time a number comes in, buffer 42 accepts them and sends the accumulated number to display 12. As a result, a number entered one after another is accumulated in buffer 42 to form a series of numbers representing called-party information.

Figure 3:
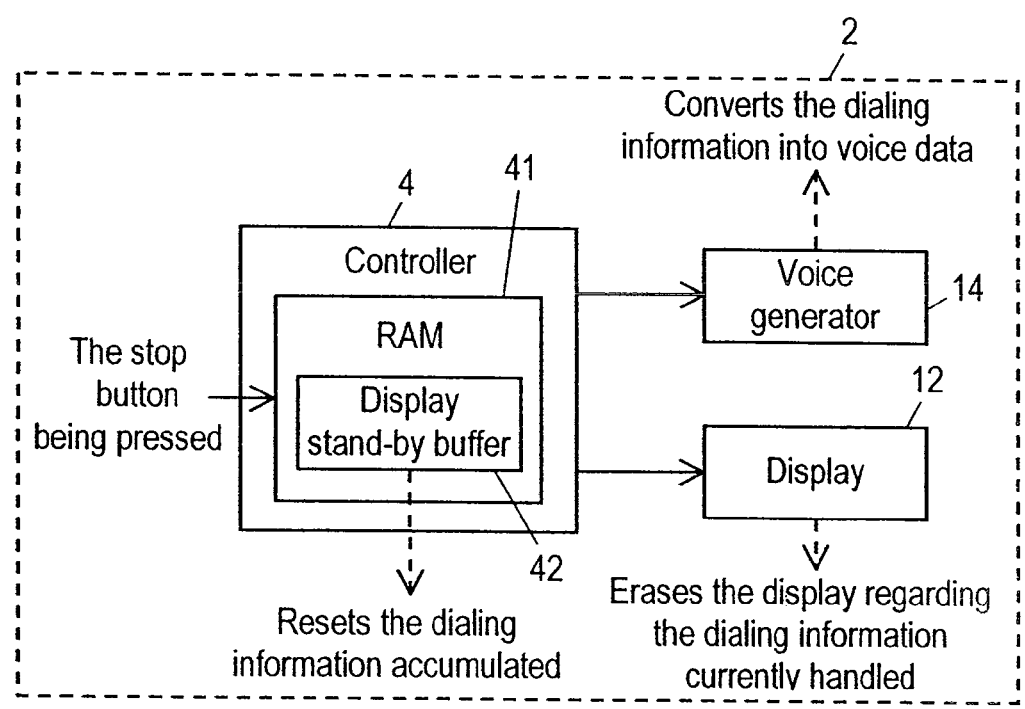
FIG. 3 is a schematic view indicating the process in which the controller of the main phone stores called-party information in response to entry-canceling operation by a user in accordance with the first preferred embodiment.

If the user mistakenly pushes a wrong button, as shown in FIG. 3, pressing a stop button disposed at operating section 11 clears off buffer 42. At the same time, the called-party information appearing on display 12 is also erased. The user can start over the number input.

When the user pushes the dialing buttons arranged in operating section 11 to input called-party information, controller 4 transmits it to voice generator 14 each time a number is entered. Controller 4 temporarily keeps the called-party information appearing on display 12 as an accumulation of numbers that have been so far entered by the user.

Now will be described the search of electronic telephone list 13 by using the list-search key disposed at operating section 11. In searching, when display 12 shows a name of, for example, "Matsushita Taro" and corresponding telephone number of "474 72 . . . ", loudspeaker 7A reads out the name and the numbers, sounding as "matsuƒita-taro-four-seven-four-seven-two . . . " in a synthesized voice. If another search is performed, the display and the reading-out are switched to newly searched information: loudspeaker 7A quits the reading-out of the previously shown name and telephone number at around the first two syllables of the name then starts to read out called-party information newly shown on display 12.

As described above, called-party information now on display 12 is kept in buffer 42 of controller 4 until next search of telephone list 13 is performed.

Figure 4:
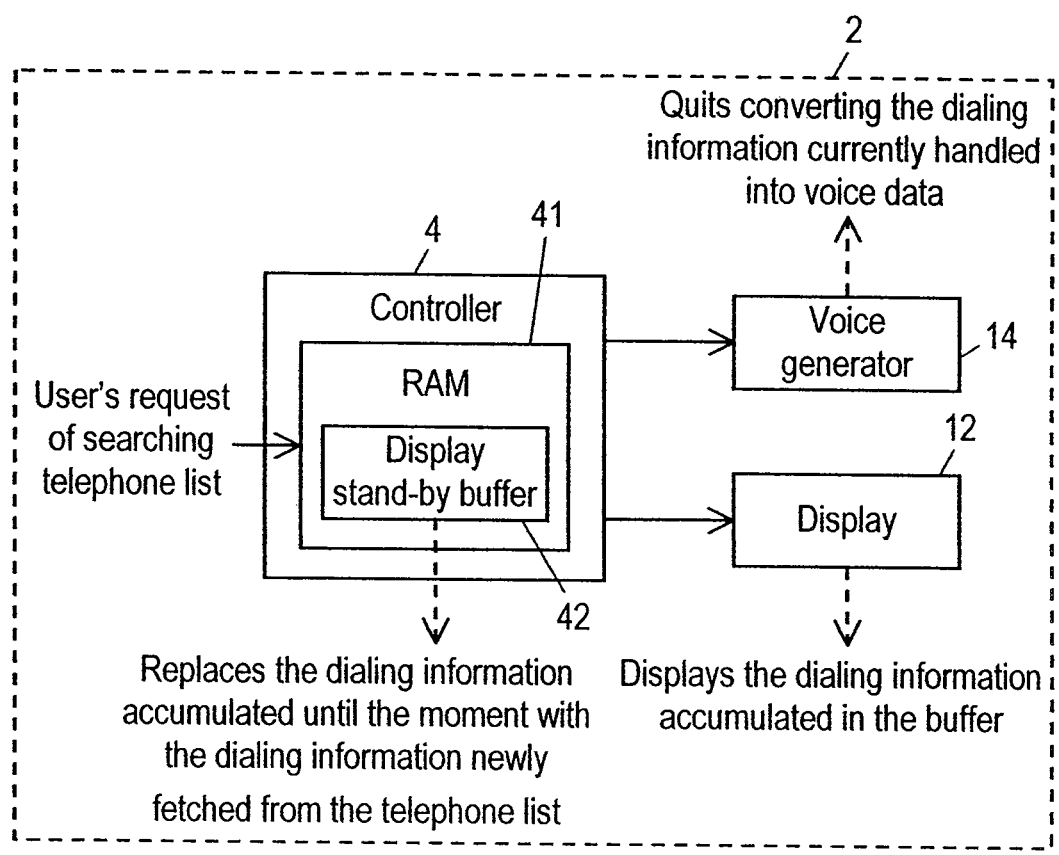
FIG. 4 is a schematic view indicating the process in which the controller of the main phone stores called-party information in response to other entry operation by a user in accordance with the first preferred embodiment.

When the user newly searches list 13 for called-party information, controller 4 fetches information that matches with the user's input from list 13. Controller 4, as shown in FIG. 4, clears off buffer 42 in which the previous information has been stored, and stores information newly fetched from list 13 into buffer 42. Each time information in buffer 42 is replaced with new one, display 12 immediately changes the display accordingly. Besides, each time called-party information in buffer 42 is changed, controller 4 asks voice generator 14 to quit converting now-handling information into voice data and to discard the information. Controller 4 transmits called-party information, which is newly stored in buffer 42, to voice generator 14 for converting the information into voice data.

When the reading-out by loudspeaker 7A is the desired called-party information, the user performs placing-a-call operation: it is usually actuated by lifting up receiver 6 from the hook, or pressing a speakerphone button disposed at speakerphone section 7. In response to the operation, controller 4 obtains telephone number information from the called-party information stored in buffer 42 and sends it to the telephone line 101. Placing a call to the called-party appearing on display 12 is thus performed.

When called-party information has the telephone number only, each number is read out one after another from loudspeaker 7A. A consideration should be taken in the case that called-party information includes a name: a name formed of letters like the katakana in Japanese would be rather recognizable if they are converted, as they are, into voice data; however, particularly the name formed of letters like the alphabet, reading out each letter one by one would be difficult to recognize them as a name. To address the problem, voice generator 14 converts the alphabetic name into voice data with reference to a voice-reference data stored in ROM of voice generator 14.

Figure 5:
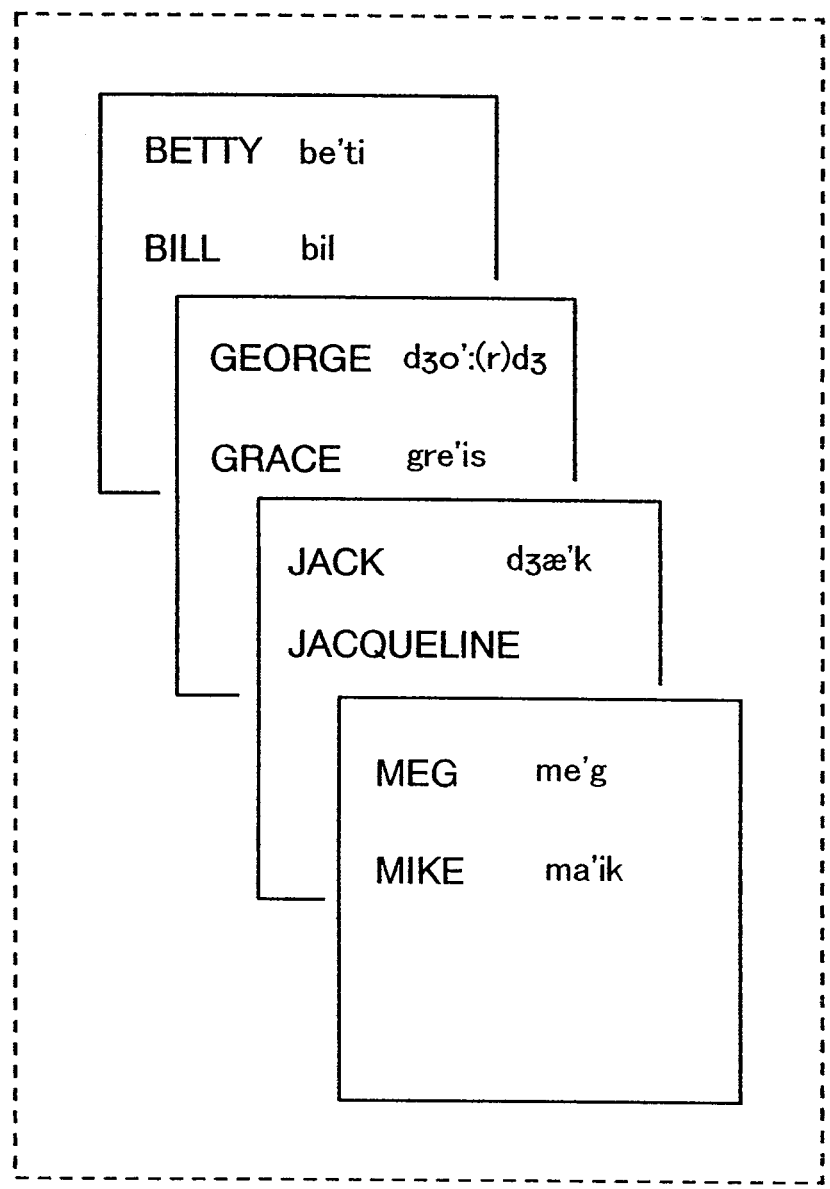
FIG. 5 is a schematic view indicating an example of the data-table structure of read only memory (ROM) in a voice generator of the cordless telephone unit in accordance with the first preferred embodiment.
Figure 6:
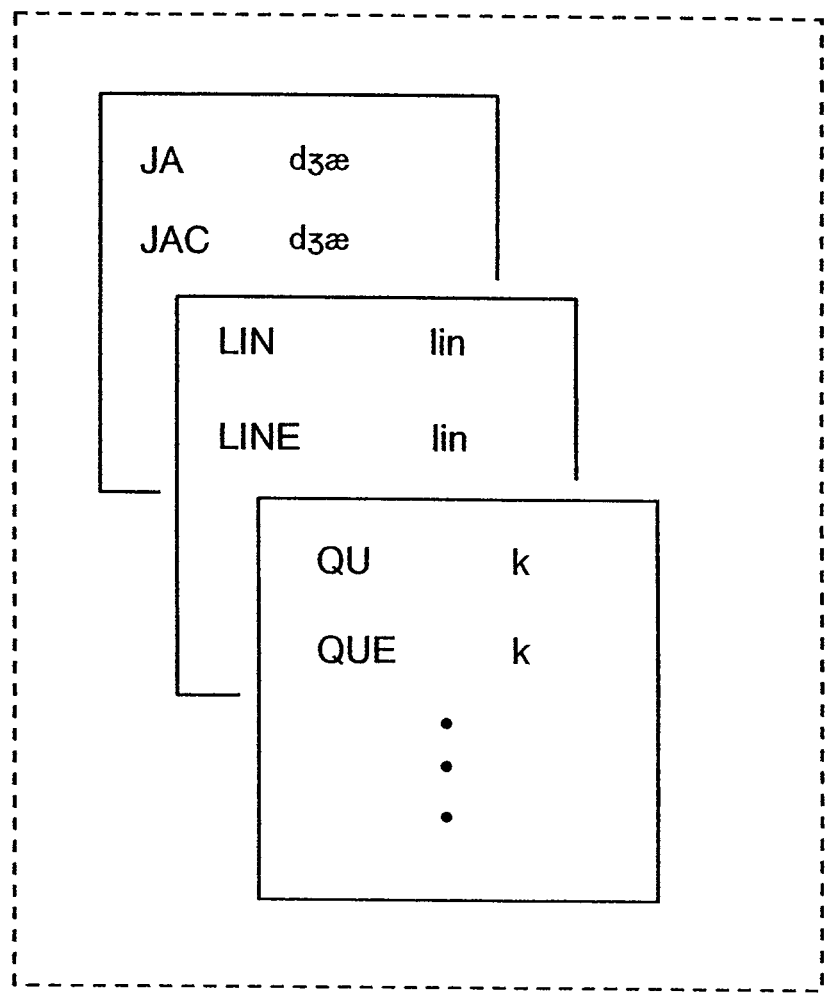
FIG. 6 is a schematic view indicating another example of the data-table structure of ROM in the voice generator of the cordless telephone unit in accordance with the first preferred embodiment.

Here will be described the voice-reference data stored in ROM. Last names and first names with high frequency of use are converted into voice data as a single unit: particularly as for the first names frequently used, such as "GEORGE" and "MIKE", as shown in FIG. 5, it would be practical for reading-out that they are each converted into $d_3o':(r)d_3$ and "ma'ik" as a single unit. However, adding names rarely used to the voice-reference data will eats up the space of ROM. To avoid such a waste, ROM in voice generator 14 contains syllable data, each of which is converted into voice data. When reading out a name, i.e., particularly the name with low frequency of use, voice generator 14 fetches some of syllable data from ROM to "patch" them into a single voice data: suppose that voice generator 14 reads out a name of "JACQUELIN", and suppose that "JACQUELIN" is rarely used name. Referring to ROM, voice generator 14 finds some pieces of syllable data that likely fit with the name and combines them into a voice data recognizable as a name. To read out "JACQUELIN", voice generator 14 fetches "JAC", "QUE", "LIN" among syllable data and combines them into the voice data of "$d_3$ae-k-lin". In this case, voice data stored in ROM may be in the form of i) a single unit that has one-by-one correspondence to names, as shown in FIG. 5; or ii) a sub unit as a syllable piece as shown in FIG. 6. Also the voice data may be in the form of both of i) and ii). In the case of i), however, voice generator 14 may not find voice data that matches with the name of a called-party. In such a name having no reference in ROM, each letter of the alphabet of the name as alphabetic text data should be converted into separate voice data: each letter of "JACQUELIN" is converted into voice data of "J", "A", "C", "Q", . . . "N".

Here will be described the structure and working principles of cordless handset 3.

Figure 7:
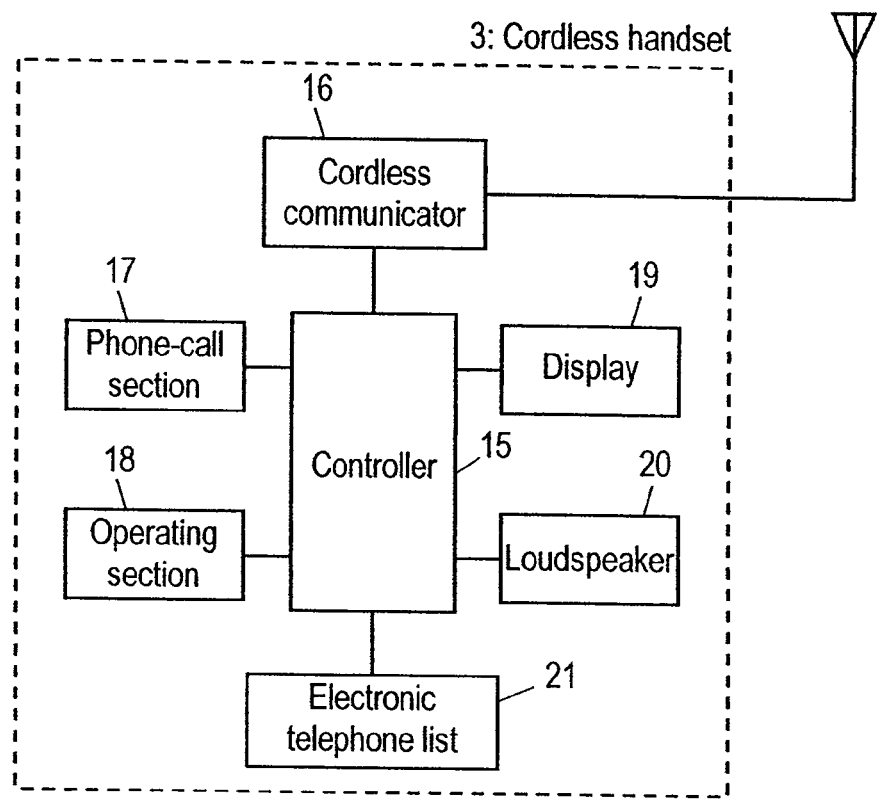
FIG. 7 is a block diagram indicating the structure of a cordless handset of the cordless telephone unit in accordance with the first preferred embodiment.

Cordless handset 3, as shown in FIG. 7, has cordless communications with main phone 2 via cordless communicator 16 (hereinafter referred to as communicator 16) having a radio transmitter and a radio receiver. Controller 15, which is formed of a central processing unit (CPU), random access memory (RAM), and read only memory (ROM), is a total controller of cordless handset 3. Like receiver 6 of main phone 2, handset 3 offers the user with phone talking via phone-call section 17. Operating section 18 functions the same as operating section 11 of main phone 2. Display 19 is formed smaller than display 12 of main phone 2, but has enough area to show the volume of information therein. Like main phone 2, handset 3 has loudspeaker 20 through which voice data received from main phone 2 are read out.

Now will be described how handset 3 works. When the user operates dialing buttons (a 10-button keypad) or searches electronic telephone list 21 through a list-search key disposed in operating section 18, handset 3 shows a called-party information on display 19. The called-party information obtained through the operation of the dialing buttons has a telephone number only. Whereas the information obtained through the operation of the list-search key has a name in addition to a telephone number. Like main phone 2, cordless handset 3 accepts whichever comes first between the operation with dialing buttons and the search with a list-search key: when the user starts pushing the buttons, the information on a called-party previously searched with the list-search key is cleared off the display; contrarily, operating the list-search key erases the information previously shown through the operation of the dialing buttons. Telephone list 21 of handset 3 has a structure similar to list 13 of main phone 2.

Figure 8:
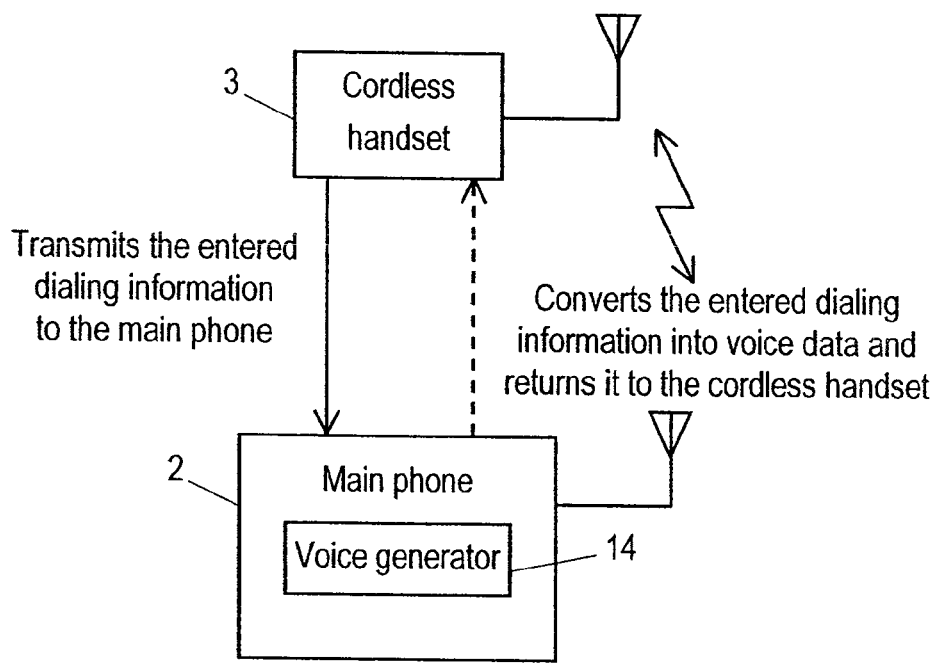
FIG. 8 is a schematic view indicating the process of transmitting/receiving called-party information in the cordless telephone unit in accordance with the first preferred embodiment.

Each time telephone-number information entered through the operation of the dialing buttons or list-search key, controller 15 of handset 3 transmits it to main phone 2 via communicator 16, as shown in FIG. 8. On the other hand, main phone 2 receives the information from handset 3 via communicator 5. On receipt of the information, controller 4 of main phone 2 transmits it to voice generator 14, where the information is converted into voice data for the telephone number. The voice data is not read out by main phone 2 but returned to cordless handset 3.

Figure 9:
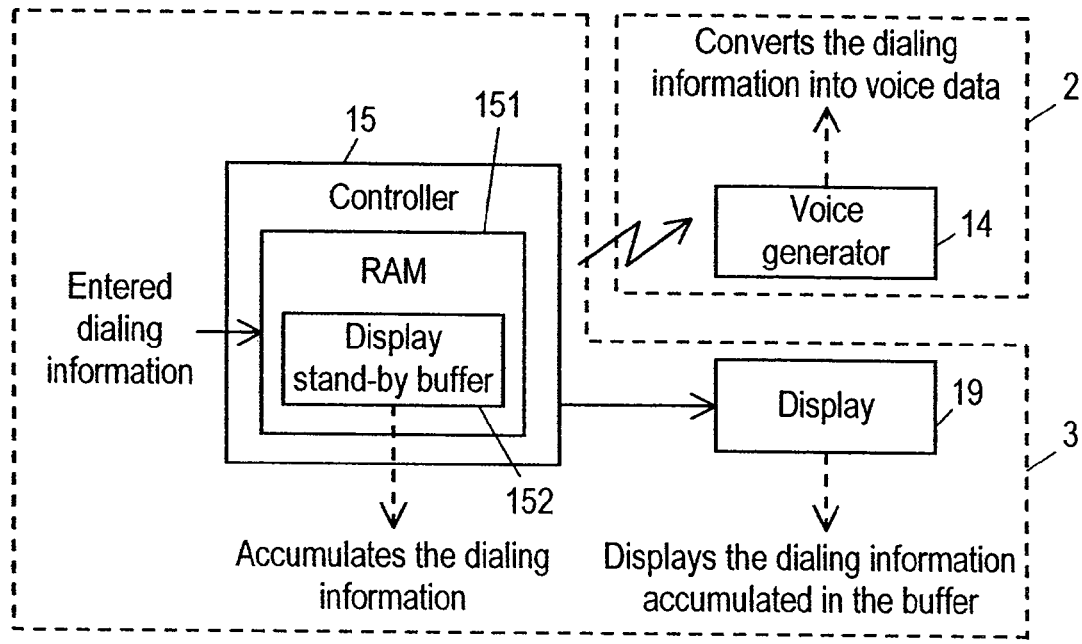
FIG. 9 is a schematic view indicating the process in which a controller of the cordless handset stores called-party information in response to entry operation by a user in accordance with the first preferred embodiment.

RAM 151 in controller 15 of handset 3 has, as shown in FIG. 9, display stand-by buffer 152 for storing called-party information to be shown on display 19. Each time a number is entered through the dialing buttons, it is accumulated in buffer 152 and shown on display 19. Similarly, information on the name and telephone number, which is obtained through the operation of list-search key, is accumulated in buffer 152 and is shown on display 19.

Now will be described the process of making a call of handset 3 by searching telephone list 21. In response to entry operation by the user, handset 3 searches list 21 for name information of called-party matching with the user's entry. The name information fetched from the list is transmitted via communicator 16 to main phone 2. Voice generator 14 of main phone 2 converts the name information to voice data and returned it to handset 3. The procedure how voice generator 14 converts name information to voice data will be evident from the description already given, referring to FIGS. 5 and 6.

Receiving the voice data returned from main phone 2, cordless handset 3 reads it out: controller 15 of handset 3 provides the voice data with analog-conversion and reads it out through loudspeaker 20. In despite of a voice generator-free structure, handset 3 can read out called-party information through loudspeaker 20. Like main phone 2, handset 3 reads out called-party information including the name and the telephone number entered through the operation of operating section 18.

Hereinafter will be given a more specific explanation of making a call from the cordless handset.

Now suppose that the making-a-call operation is initiated through the dialing buttons of the cordless handset. Each time the user pushes one of the buttons arranged in operating section 18, number information associated with each button is transmitted via communicator 16 to voice generator 14 of main phone 2. At the same time, the number information is accumulated in display stand-by buffer 152 in RAM 151. Buffer 152 sends the number information accumulated therein to display 19, where the information is shown as called-party information. Each time the information accumulated changes due to additional number-entry or re-entry after canceling, buffer 152 sends the renewed data to display 19.

Suppose that the user enters, through the dialing buttons, a series of numbers, "4", "7", "4", . . . . The numbers are sent one after another as number information via communicator 16 to main phone 2. Receiving the information, voice generator 14 converts it into voice data then returns the data to cordless handset 3. Controller 15 of handset 3 provides the voice data with analog-conversion, then finally, loudspeaker 20 reads it out "four" in a synthesized voice; on the other hand, buffer 152 of handset 3 accumulates the number information of "4" and also sends it to display 19. As a result, the number "4" appears on display 19. The incoming numbers following to the number "4" are similarly handled—i) sent to main phone 2 via communicator 16; ii) converted into voice data at voice generator 14; and iii) returned to handset 3.

On receipt of the voice data from main phone 2, controller 15 of handset 3 immediately converts it into analog form prior to reading-out. Each time a number is entered, handset 3 reads it out. On the other hand, display 19 changes the display as the number is entered one after another—seen as "4_", then "47_", further "474_"; in the meantime, display stand-by buffer 152 has accumulated the numbers of "474".

Figure 10:
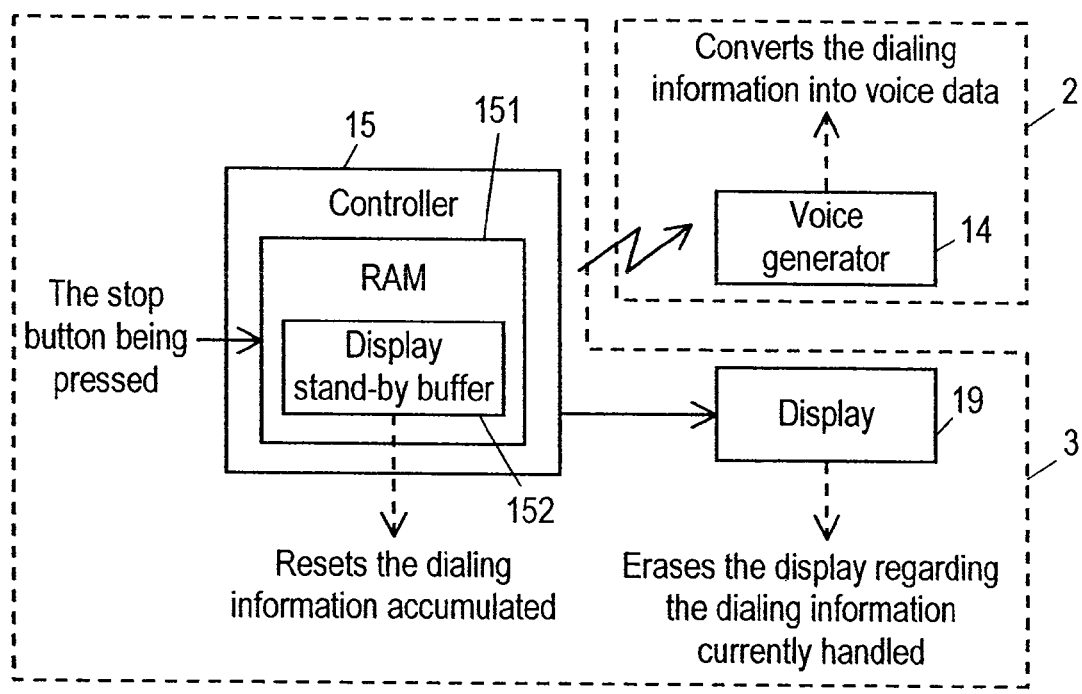
FIG. 10 is a schematic view indicating the process in which the controller of the cordless handset stores called-party information in response to entry-canceling operation by a user in accordance with the first preferred embodiment.

Now will be described the case in which the user has re-entry operation, referring to FIG. 10. Suppose that the user mistakenly enters a wrong number. Pressing the stop button disposed at operating section 18 clears the information not only in buffer 152, but also on display 19. The user can start over the telephone number entry. Each time the information stored in buffer 152 is replaced with new one, controller 15 asks voice generator 14 to quit converting now-handling information into voice data and to discard the information. Controller 15 transmits called-party information, which is newly stored in buffer 152, to voice generator 14 for converting the information into voice data.

Figure 11:
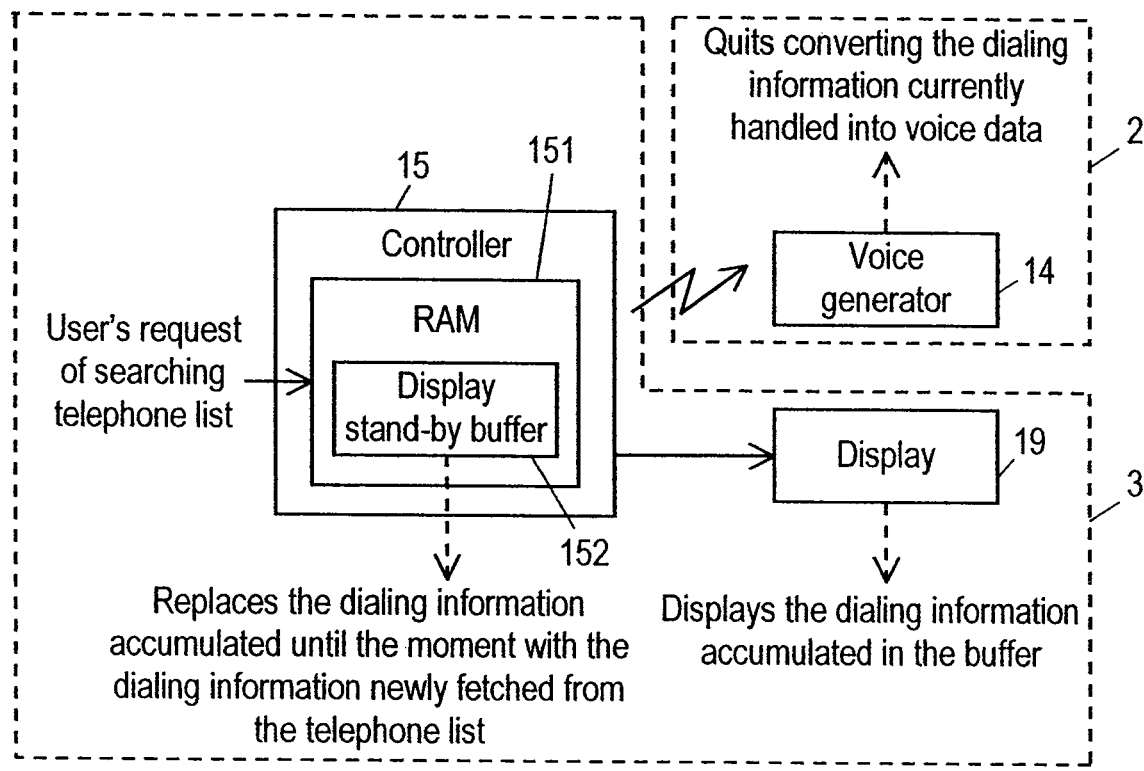
FIG. 11 is a schematic view indicating the process in which the controller of the cordless handset stores called-party information in response to other entry operation by a user in accordance with the first preferred embodiment.

Referring to FIG. 11, now will be described the case in which the user places a call through getting an access to the electronic telephone list.

Adding the name and telephone number of frequently used called-party to list 21 offers the user a quick search. Through the operation of the dialing buttons arranged in operating section 18, the user enters a clue to a desired called-party: the clue may be the first letter of the name of a called-party or may be grouping information. In response to the entry, controller 15 of handset 3 searches telephone list 21 for called-party information and transmits the result to display 19. Display 19 shows the information including the name and telephone number.

When the user starts operation for placing a call with called-party information including the name and telephone number shown on display 19, the information is transmitted via communicator 16 to main phone 2. Receiving the information, main phone 2 sends it to phone-call circuit 10 to set in motion for making-a-call. On the other hand, voice generator 14 of main phone 2 converts the information including the name and telephone number into voice data, and returns the voice data to cordless handset 3. Receiving the voice data from main phone 2, controller 15 of handset 3 immediately converts it into analog form so as to be read out through loudspeaker 20. Through the process above, when the user starts placing-a-call operation, with called-party information of "Matsushita Taro 474 72 . . . " shown on display 19, voice generator 14 converts the information into voice data, so that the user can hear the voice message saying "matsuʃita-taro-four-seven-four-seven-two . . . . " in a synthesized voice from loudspeaker 20.

The voice message may notify the user that he/she has entered a wrong number. In this case, pressing the stop button disposed in operating section 18 cancels the call. A signal indicating the press of the stop button is transmitted via communicator 16 to main phone 2, which cancels the making-a-call operation and asks to discard called-party information in use. Besides, pressing the stop button clears off display stand-by buffer 152 and called-party information on display 19. In response to another search requested by the user, called-party information newly fetched from list 21 appears on display 19.

Called-party information appearing on display 19 is kept in buffer 152 until controller 15 performs next search of telephone list 21. When the user newly searches list 21 for called-party information, controller 15 fetches information that matches with the user's input from list 21. Controller 15 clears off buffer 152 in which the previous information has been stored, and stores information newly fetched from list 21 into buffer 152. Each time the information stored in buffer 152 is replaced with new one, as shown in FIG. 11, display 19 immediately changes the display accordingly.

Now will be described another example of placing a call having an access to list 21.

In response to search request by the user, called-party information newly fetched from list 21 appears on display 19. Suppose that the information fetched has the name of "Matsushita Taro" and has the telephone number of "474 72 . . . ". The number information is accumulated into display stand-by buffer 152 in RAM 151 of cordless handset 3 and is shown on display 19. In the meantime, the name information is transmitted one after another from the first letter of the name, via communicator 16 to main phone 2. Receiving the information from handset 3, voice generator 14 of main phone 2 converts it into voice data one by one, and then returns the voice data to handset 3. On receipt of the voice data, controller 15 of handset 3 converts it into analog form so as to be read out through loudspeaker 20. According to the structure of the embodiment, the read-out through loudspeaker 20 follows display on display 19 with a delay—that comes from the necessity for data passing between the main phone and the handset and for voice-generating.

When the called-party information that has been read-out through loudspeaker 20 of handset 3 is a desired one for the user, he/she starts placing-a-call operation, for example, by pressing the speakerphone button. In response to such operation, controller 15 seeks out the telephone number of called-party information stored in buffer 152 and transmits via main phone 2 to the telephone line. The making-a-call operation to the called-party appearing on the display is thus performed.

On the other hand, if the user noticed that the read-out through loudspeaker 20 of handset 3 differed from his/her intention, the user tries another search having an access to list 21 through operating section 18. In response to the operation, controller 15 immediately changes display on display 19 and asks voice generator 14 of main phone 2 to quit converting now-handling information into voice data and to discard the information. Controller 15 transmits telephone number information, which newly appears on the display 19, to main phone 2. Receiving the information, voice generator 14 of main phone 2 converts it into voice data, and returns it to handset 3. The voice data is immediately read out through loudspeaker 20. The display and the reading-out are switched to newly searched information: loudspeaker 20 quits the reading-out of the previously shown name and telephone number at around the first two syllables of the name then starts to read out called-party information newly shown on display 19.

According to the embodiment, as described above, handset 3 has a voice generator-free structure: as long as the main phone has a voice-generating function, the cordless handset can provide the user with an audible confirmation about a called-party prior to making a call. This will be a great help to a person who has weak eyes, reducing a possibility of having a wrong number. Besides, the voice generator-free structure of the handset can reduce parts mounted thereon, thereby lowering production cost.

Second Preferred Embodiment

The read-out function described in the previous embodiment is readily adaptable for notifying the user who the caller is: the second preferred embodiment introduces the case of reading out calling-party information distributed from a caller-notification service to the main phone, together with bell ringing. The process of converting calling-party information into voice data is substantially the same as that for called-party information.

Figure 12:
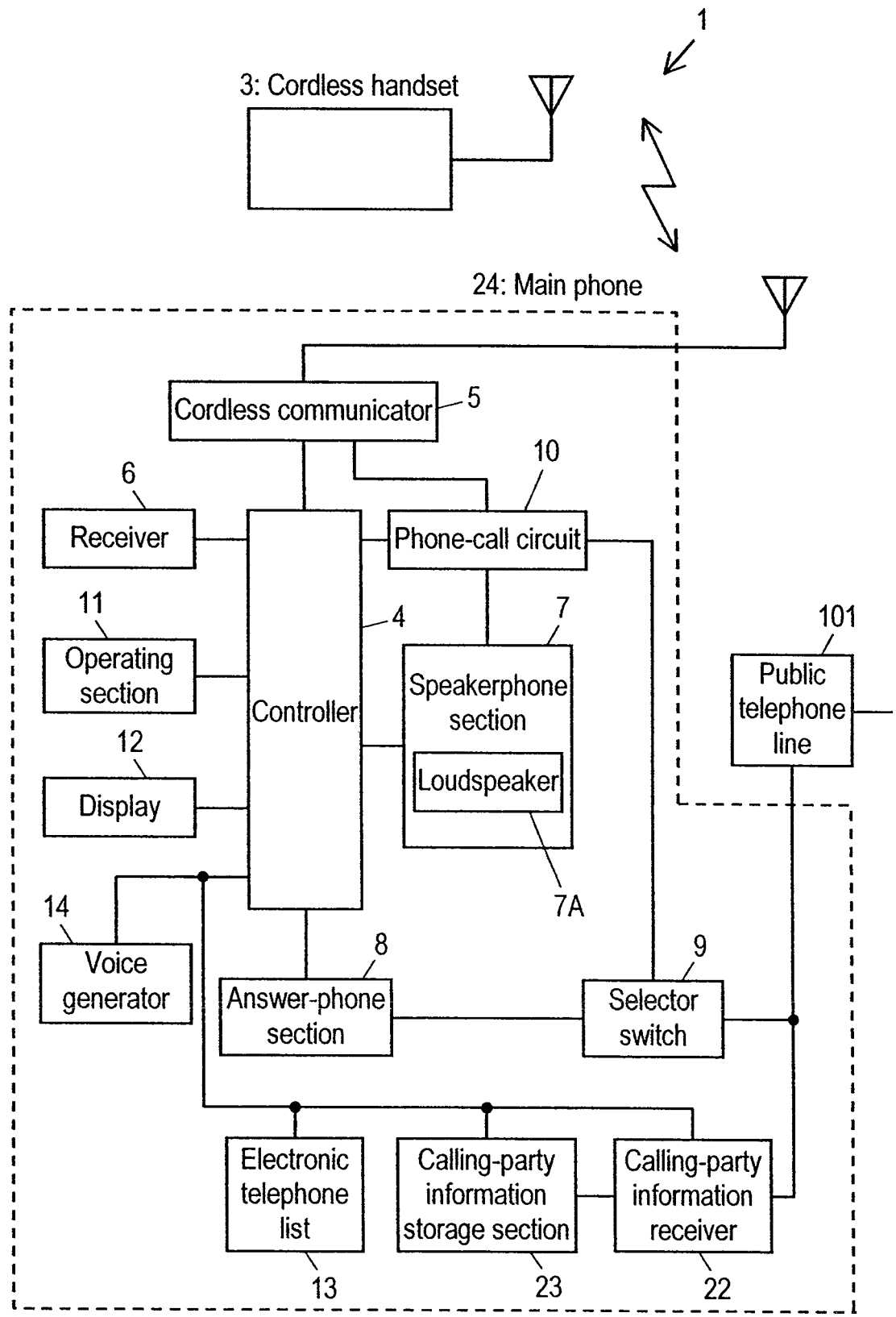
FIG. 12 is a block diagram indicating the structure of a main phone of a cordless telephone unit in accordance with a second preferred embodiment.

When main phone 24 having a structure in FIG. 12 receives the bell from the telephone line 101, controller 4 operates selector switch 9 so as to accept the bell from line 101. The caller-notification service delivers calling-party information, inserting between the signals of ringing the bell. Receiving the bell, controller 4 orders calling-party information receiver 22 to receive calling-party information and send it to calling-party information storage unit 23.

Controller 4 fetches the calling-party information from storage unit 23 and transmits it to voice generator 14 and display 12, which is typically formed of a liquid crystal display (LCD). Display 12 shows the calling-party information as text data thereon; on the other hand, voice generator 14 converts the information into voice data so as to be read out as a name and telephone number through loudspeaker 7A. In addition, controller 4 returns the voice data to handset 3. The voice data received from main phone 24 is read out through loudspeaker 20 of handset 3 as a name and telephone number.

According to the present invention, as described above, main phone 24 equipped with voice generator 14 converts calling-party information into voice data, and returns it to cordless handset 3. Such structured cordless telephone unit provides the user with reading-out of a name and telephone number, even in the use of handset 3 having no voice generator therein.

Although the explanation above focuses on the function as a telephone, the cordless telephone unit may have a fax-equipped structure.

What is claimed is:

1. A phone apparatus comprising:
    an electronic telephone list for storing names corresponding to respective telephone numbers;
    a sound generator configured to convert the names into sound data corresponding to a voice;
    a speaker configured to output the sound data; and
    a display for displaying one of the names being called by the phone apparatus,
    wherein the sound data output from said speaker is stopped before all of the sound data corresponding to the one of the names is output responsive to said sound generator receiving a new one of the names, said sound generator converts the new one of the names received by said input unit into new sound data, and said speaker outputs the new sound data, and
    said display replaces display of the one of the names with the new one of the names.

2. The phone apparatus according to claim 1, further comprising an input unit including a plurality of keys which are selectable by a user, the input unit being used to provide a selection among the names stored in the electronic telephone list.

3. The phone apparatus according to claim 2, further comprising:
    a handset; and
    a main unit.

4. The phone apparatus according to claim 3, wherein said handset and said main unit communicate using radio communication.

5. The phone apparatus accordingly to claim 4, wherein said handset includes said input unit and said speaker, said main unit includes said sound generator, the selection received by said input unit of said handset is transmitted to said main unit using the radio communication as said one of the names, said sound generator of said main unit converts the one of the names into the sound data, the sound data converted from the one of the names by said sound generator is transmitted to said handset using the radio communication, and said speaker of said handset outputs the sound data.

6. The phone apparatus according to claim 2, wherein the selection received by said input unit includes a number.

7. The phone apparatus according to claim 2, wherein the selection received by said input unit includes a letter.

8. The phone apparatus according to claim 1, wherein the sound data further includes the respective telephone number.

9. A method for establishing a phone call comprising:
    receiving a selection for one name from among names corresponding to respective telephone numbers stored in an electronic telephone list;
    converting, by a sound generator, the one name into sound data corresponding to a voice;
    outputting the sound data; and
    displaying the one name being called on a display of a phone apparatus,
    wherein the output of the sound data is stopped before all of the sound data corresponding to the one name is output responsive to the sound generator receiving a new one of the names, the new one of the names is converted into new sound data by the sound generator, and the new sound data is output, and
    said one name is replaced with the new one of the names on said display.

10. The method according to claim 9, wherein the sound data further includes the respective telephone number.

* * * * *